United States Patent
Shastri et al.

(10) Patent No.: US 7,657,130 B2
(45) Date of Patent: Feb. 2, 2010

(54) SILICON-BASED OPTICAL MODULATOR FOR ANALOG APPLICATIONS

(75) Inventors: Kalpendu Shastri, Orefield, PA (US); Prakash Gothoskar, Allentown, PA (US); Vipulkumar Patel, Breinigsville, PA (US); David Piede, Allentown, PA (US); Mark Webster, Bethlehem, PA (US)

(73) Assignee: Lightwire, Inc., Allentown, PA (US)

( * ) Notice: Subject to any disclaimer, the term of this patent is extended or adjusted under 35 U.S.C. 154(b) by 0 days.

(21) Appl. No.: 12/287,366

(22) Filed: Oct. 8, 2008

(65) Prior Publication Data

US 2009/0103850 A1 Apr. 23, 2009

Related U.S. Application Data

(60) Provisional application No. 60/999,784, filed on Oct. 19, 2007, provisional application No. 61/188,975, filed on Aug. 13, 2008.

(51) Int. Cl.
 *G02F 1/035* (2006.01)
 *G02F 1/01* (2006.01)
 *G02B 6/12* (2006.01)
(52) U.S. Cl. .................. 385/2; 385/1; 385/3; 385/14
(58) Field of Classification Search .................. 385/1–3
 See application file for complete search history.

(56) References Cited

U.S. PATENT DOCUMENTS

| | | | | |
|---|---|---|---|---|
| 4,709,978 | A | * | 12/1987 | Jackel ............................. 385/3 |
| 5,321,543 | A | | 6/1994 | Huber |
| 5,337,398 | A | | 8/1994 | Benzoni et al. |
| 5,347,601 | A | * | 9/1994 | Ade et al. ....................... 385/3 |
| 5,838,484 | A | | 11/1998 | Goossen |
| 6,091,864 | A | | 7/2000 | Hofmeister |
| 6,310,902 | B1 | | 10/2001 | Bylsma et al. |
| 6,490,068 | B1 | | 12/2002 | Heflinger et al. |
| 6,678,428 | B2 | | 1/2004 | Seino et al. |
| 6,753,992 | B2 | | 6/2004 | Steier et al. |
| 6,766,070 | B2 | | 7/2004 | Williams et al. |
| 6,845,198 | B2 | | 1/2005 | Montgomery et al. |
| 6,895,157 | B2 | | 5/2005 | Toofan et al. |
| 6,933,583 | B2 | | 8/2005 | Kunkee et al. |

(Continued)

FOREIGN PATENT DOCUMENTS

WO WO-2005/082091 9/2005

OTHER PUBLICATIONS

Cappelluti, et al, "Balanced Electroabsorption Modulator for High-Linearity Low-Noise Microwave Analog Optical Link", Electrical Engineering Dept., University of Cal., L.A.

*Primary Examiner*—Frank G Font
*Assistant Examiner*—Robert Tavlykaev
(74) *Attorney, Agent, or Firm*—Wendy W. Koba

(57) ABSTRACT

A silicon-insulator-silicon capacitive (SISCAP) optical modulator is configured to provide analog operation for applications which previously required the use of relatively large, power-consuming and expensive lithium niobate devices. An MZI-based SISCAP modulator (preferably a balanced arrangement with a SISCAP device on each arm) is responsive to an incoming high frequency electrical signal and is biased in a region where the capacitance of the device is essentially constant and the transform function of the MZI is linear.

14 Claims, 8 Drawing Sheets

U.S. PATENT DOCUMENTS

| | | |
|---|---|---|
| 6,943,931 B1 | 9/2005 | Dingel |
| 6,970,279 B2 | 11/2005 | Ahearn et al. |
| 6,985,273 B2 | 1/2006 | Kang et al. |
| 7,065,301 B2 | 6/2006 | Shastri et al. |
| 7,082,237 B2 | 7/2006 | Walker et al. |
| 7,127,129 B2 | 10/2006 | Liu |
| 7,218,799 B2 | 5/2007 | Deliwala |
| 7,257,283 B1 | 8/2007 | Liu et al. |
| 7,394,948 B1 | 7/2008 | Zheng et al. |
| 7,400,788 B2 | 7/2008 | Magde et al. |
| 7,421,168 B1 | 9/2008 | Goutzoulis |
| 2003/0068152 A1 | 4/2003 | Gunn, III |
| 2003/0147577 A1* | 8/2003 | Kataoka et al. ............... 385/3 |
| 2003/0223672 A1* | 12/2003 | Joyner et al. ............... 385/14 |
| 2004/0208454 A1* | 10/2004 | Montgomery et al. ......... 385/50 |
| 2005/0105848 A1* | 5/2005 | Yamada et al. ............... 385/31 |
| 2007/0019919 A1 | 1/2007 | Bloemer et al. |

\* cited by examiner

SILICON-BASED OPTICAL MODULATOR FOR ANALOG APPLICATIONS

CROSS-REFERENCE TO RELATED APPLICATIONS

This application claims the benefit of U.S. Provisional Application Nos. 60/999,784, filed Oct. 19, 2007 and 61/188,975, filed Aug. 13, 2008.

TECHNICAL FIELD

The present invention relates to an optical modulator for use with analog input signals (RF electrical input signals, for example) and, more particularly, to a silicon-based, relatively small analog optical modulator biased to operate in a linear region in which the analog input signal will be accurately replicated as the modulator's optical output signal.

BACKGROUND OF THE INVENTION

Analog optical communication links are known in the prior art. Conventional optical analog links employ intensity modulation techniques to convert the analog information into an optical signal. Analog optical links are utilized, for example, by the cable television industry to transmit video images using the conventional RF analog modulation format, as well as in numerous RF antenna applications.

In most optical analog links, the information is converted from RF (electrical) signals to optical signals through the use of an external Mach-Zehnder intensity modulator (MZI). Conventional electro-optic modulators (EOMs) are generally based on proton-exchanged or Ti-diffused waveguides in an optically active material, such as lithium niobate ($LiNbO_3$). In operation, when an electric field is applied across an optically active waveguide, the optical path length of the waveguide will be altered, allowing the phase of the output signal to be controlled accordingly. This effect is used to both alter the phase of the light (i.e., phase modulators) and to produce amplitude modulation when the waveguide is placed within an interferometer.

$LiNbO_3$-based devices are relatively large (having a length on the order of, for example, 75 mm), which makes them ill-suited for many current applications which require high density integration, as well as a high degree of linearity. Further, these devices are known to exhibit a "voltage sensitivity" (denoted as $V_\pi$, which defines the amount of voltage required to provide a complete 180° phase shift) on the order of three volts. This relatively large $V_\pi$ has also been found to result in the following: (1) relatively low link gain, on the order of −26 dB at 10 mW input optical power; (2) a large noise factor (NF), on the order of 33 dB at 10 mW input optical power; and (3) large input third order intercept point (TOI) of greater than 19 dBm. Moreover, the power dissipation associated with conventional $LiNbO_3$ modulators renders them essentially useless for applications where available power or power consumption is a concern.

SUMMARY OF THE INVENTION

The needs remaining in the prior art are addressed by the present invention, which relates to an optical modulator for use with analog RF input signals and, more particularly, to a silicon-based, relatively small, analog optical modulator biased to operate in its linear region in response to an analog input signal.

In accordance with the present invention, an analog optical modulator in the form of a Mach-Zehnder interferometer (MZI) is formed to include at least one silicon-insulator-silicon capacitor (SISCAP) optical waveguiding device as a modulating element. The SISCAP structure (described in detail in applicants' prior U.S. Pat. Nos. 6,845,198 and 7,065,301; herein incorporated by reference), is particularly biased in this analog application to operate in a region where the capacitance remains essentially constant, allowing for a linear change in the charge accumulated or depleted in the SISCAP optical waveguiding device.

In one embodiment of the present invention, a single SISCAP device may be used, disposed along one arm of the MZI structure. Preferably, a pair of SISCAP devices are used in a balanced configuration, disposed in parallel along each arm. The balanced arrangement is preferred inasmuch as it allows for adjustment in biasing conditions to overcome inherent fabrication differences between the waveguides. The ability to configure this arrangement in a common mode embodiment allows for differential signaling and reduced voltage levels to be used to obtain the same results as compared to the "single-sided" embodiment.

In one embodiment, the SISCAP structure is biased at/near 0 V, where this level has been shown to be associated with a relatively small capacitance, which is essentially constant as a function of voltage. In a particular configuration of this embodiment, a low-pass filter is disposed between the high-frequency electrical input signal and one arm of the MZI to ensure MZI operation around the zero bias value, irrespective of the RF input signal and allowing operation at higher frequencies.

In another embodiment, the SISCAP structure is biased to remain in the accumulation mode, at a value where the C-V curve is essentially flat at a maximum capacitance value. This embodiment is useful for applications where the input signal is relatively weak and a larger phase shift is required.

It is an advantage of the arrangement of the present invention that the use of silicon-based SISCAP optical devices allows for the formation of an analog optical modulator which is orders of magnitude smaller in overall dimensions than the above-described prior art $LiNbO_3$ devices. In particular, a SISCAP analog optical modulator of the present invention requires a length on the order of about 100 μm (compared with 75 mm for the prior art) and a voltage sensitivity V, of about 0.8 V (compared with a V, of the prior art on the order of 3.0 V).

Importantly, the use of a silicon-based modulator allows for associated optical components (such as, for example, optical filters and photodetectors) and associated electrical components (such as, for example, transimpedance amplifiers and input signal filters) to be directly integrated within the same silicon substrate as the modulator, further reducing the size and cost of the complete system. Indeed, the use of a silicon-based analog optical modulator in accordance with the present invention allows for multiple modulators, disposed in various types of array configurations, to all be integrated within a single silicon substrate—along with associated optical and electrical components. The ability to form a monolithic array of optical modulators is considered a significant advance, particularly in light of various applications which require a small form factor for these components.

Other and further embodiments and features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
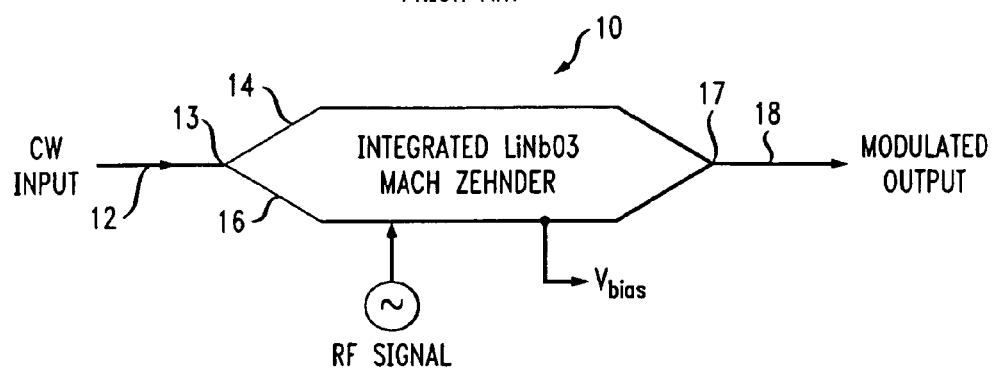
FIG. 1 is a block diagram illustration of a prior art LiNbO$_3$ optical modulator.

FIG. 1 illustrates a conventional prior art method of transmitting information on an optical carrier. A continuous wave (CW) optical input is coupled into input waveguide 12 of a Mach-Zehnder interferometer (MZI 10) and is then split at an input Y-branch 13 to thereafter propagate along a pair of parallel optical waveguide arms 14 and 16. Parallel optical waveguide arms 14, 16 form two phase modulators which operate in the well-known push-pull manner. In this prior art arrangement, phase modulation is made possible due to the electro-optic properties of the LiNbO$_3$ material used for the modulator. Optical signals from the upper waveguide path 14 and lower waveguide path 16 are recombined at the output Y-branch 17 and then propagate along output waveguide 18. If the optical beams from the two paths 14, 16 arrive in phase, light will be guided out of the MZI 10, and vice-versa (that is, if the two signals arrive 180° out of phase—cancelling each other—no light will be coupled into output waveguide 18).

Figure 2:
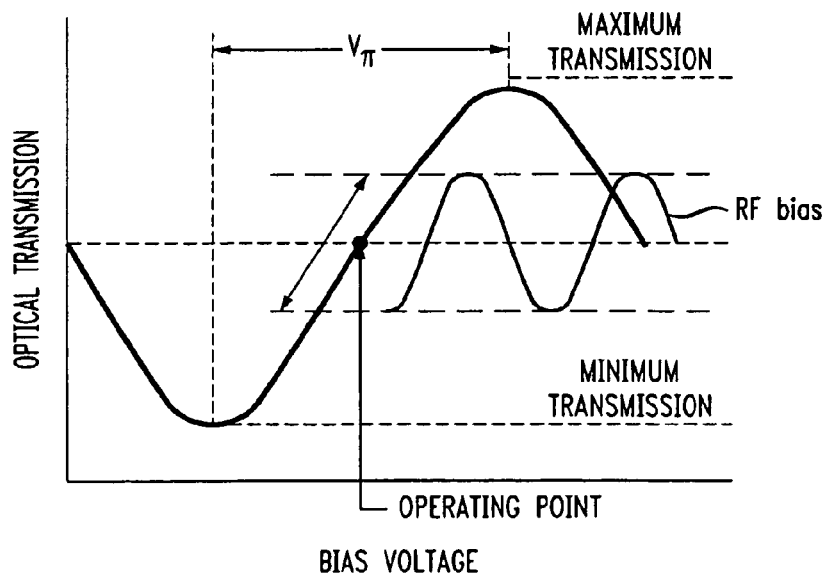
FIG. 2 depicts the transfer function of the prior art modulator of FIG. 1.

Thus, MZI 10 can be used to produce a variable transmission loss as a function of changes in electrical (RF) bias applied to MZI 10. FIG. 2 illustrates the optical output from MZI 10 as a function of the applied input electrical signal. The "maximum" transmission value (associated with "in phase") and "minimum" (associated with "out of phase") are shown. For analog applications, the output remains within the linear region, where the applied RF signal (also shown in FIG. 2) can be accurately replicated by the output optical signal. By applying a known bias voltage to the arrangement, the operating point on the curve of FIG. 2 is defined, allowing for desired linear operation to be achieved. With this understanding of a prior art analog optical modulator, the advantages of the silicon-based analog optical modulator will be explained below.

Figure 3:
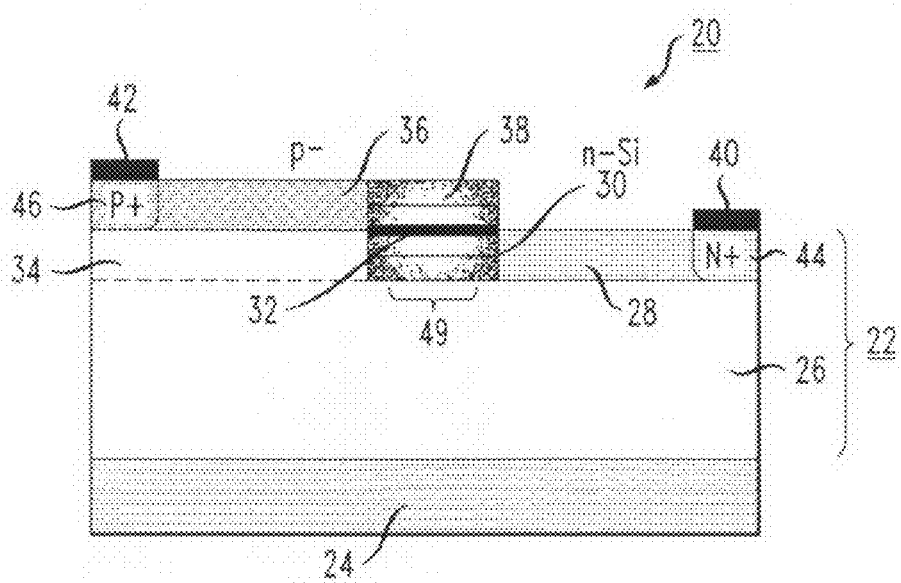
FIG. 3 is a cross-sectional view of an exemplary SISCAP optical waveguiding device used to form the analog optical modulator of the present invention.

FIG. 3 is a cross-sectional view of an exemplary silicon-insulator-silicon capacitive (SSICAP) waveguiding device 20 which is used as the basis for an analog optical modulator formed in accordance with the present invention. As shown, SISCAP optical waveguiding device 20 is integrated within a silicon-on-insulator (501) structure 22 including a silicon substrate 24, an insulating layer 26 (also referred to in the art as a "buried oxide", or BOX layer) and a relatively thin silicon surface layer 28 (also referred to as the SOI layer). The term "relatively thin", when used in the context of describing SOI layer 28 of the present invention, is intended to define a thickness of less than one-half micron (at times, referred to as a "sub-micron thickness SOI layer"). A region 30 of SOI layer 28 is doped (in this case with an n-type dopant) to form the first "plate" of SISCAP optical waveguiding device 20. A thin oxide layer 32 (also referred to as a "gate oxide" layer) is disposed over n-doped region 30 to form the "dielectric" of SISCAP device 20. An insulating region 34 is formed adjacent to n-doped region 30 to aid in optical signal confinement.

A second silicon layer 36, preferably comprising polysilicon, is disposed to overlap n-doped region 30 of SOI layer 28 and insulating region 34. As shown in FIG. 3, a region 38 of polysilicon layer 36 which overlies n-doped region 30 is oppositely doped (in this case with a p-type dopant) to form the second "plate" of the capacitor structure.

A first electrical contact 40 is disposed on SOI layer 28 and a second electrical contact 42 is disposed on polysilicon layer 36, where the application of a modulating electrical signal therebetween will modify the optical characteristics (e.g., refractive index) of SISCAP optical waveguiding device 20 and thus affect the properties of a propagating optical signal. In a preferred embodiment, a heavily-doped contact area 44 is formed in SOI layer 28 underneath electrical contact 40 to lower the contact resistance of first electrical contact 40. A similar heavily-doped contact area 46 is formed within polysilicon layer 36 underneath second electrical contact 42. A complete description of this SISCAP optical waveguiding structure and characteristics may be found in our above-cited '198 patent.

Figure 4:
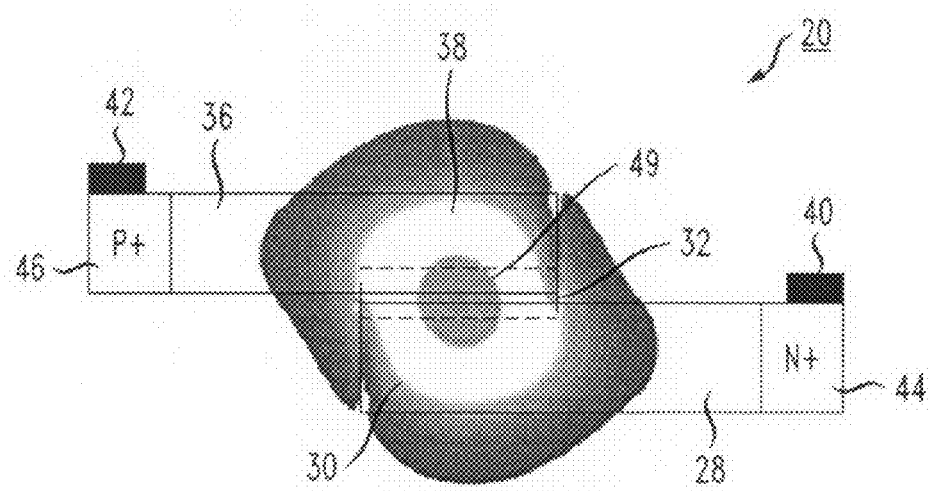
FIG. 4 is a detailed illustration of the optical properties of the SISCAP device of FIG. 3.

As will be discussed in detail below, an optical signal is directed to propagate along a waveguiding, active portion 49 of SISCAP device 20—into/out of the page in the view of FIG. 3. FIG. 4 is an enlarged view of SISCAP device 20, with various support portions of SOI structure 22 removed for clarity. Also shown in this view is the carrier modulation area (dotted line box) and the optical mode of the propagating signal.

Figure 5:
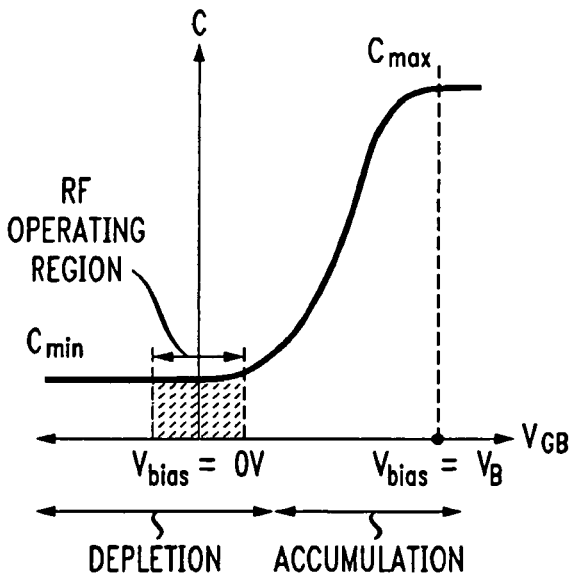
FIG. 5 is a C-V curve associated with the SISCAP optical waveguiding device of FIG. 3.

FIG. 5 shows a typical Capacitance vs Gate Voltage (CV) diagram of a SISCAP optical waveguiding device 20 as used in the analog modulator of the present invention. In accordance with the present invention, it is preferred to operate SISCAP device 20 in a region where the capacitance changes little (if at all), as the applied voltage changes. This "constant" value of capacitance enables a linear change in the charge of the SISCAP device as a function of voltage.

For applications involving very high frequency input signals (in the GHz range, perhaps 1 GHz or higher), SISCAP device 20 is configured to exhibit a reduced capacitance and series resistance. The design consideration for the series resistance is selected based upon the optical loss requirements for the specific application. Operation of SISCAP device 20 in its lowest capacitance mode is desirable when the application demands higher frequencies and lower phase shifts (on the order of, for example, $\pi/20$).

In a full accumulation mode (at $C_{max}$, as shown in FIG. 5), a defined region of modulation around the defined operating point (bias voltage $V_B$ in FIG. 5) also results in a linear change in the free-carrier concentration ($Q_{free-carrier} = C_{max} * V_B$). A SISCAP analog modulator of the present invention which is operated in a full accumulation mode around $C_{max}$ will therefore exhibit a linear relationship between the applied bias and the accumulated free-carrier charge. A larger capacitance results in a larger phase shift. Consequently, for applications where larger phase shifts are required, the modulator should be operated at or near $C_{max}$.

Figure 6:
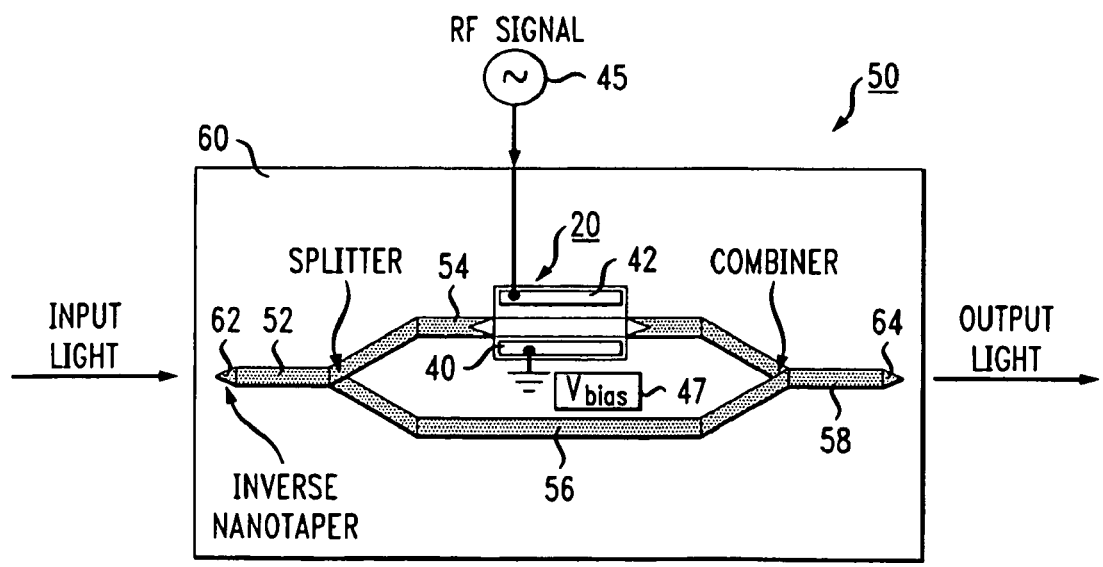
FIG. 6 illustrates an exemplary silicon-based analog optical modulator formed in accordance with the present invention.

FIG. 6 illustrates an exemplary SISCAP analog optical modulator 50, formed in accordance with the principles of the present invention as outlined above (e.g., fully integrated within an SOI structure 60 as indicated by the shaded area in FIG. 6). Advantages of such an arrangement over the prior art include, among others, its reduced dimensions (compared to LiNbO$_3$ devices), reduced power consumption, ease of integration with other components, and the like. As will be discussed in detail below, the ability to completely integrate an analog optical modulator within a silicon substrate allows for various array arrangements of modulators to be formed as a monolithic arrangement.

Referring again to FIG. 6, an incoming continuous wave optical signal (such as from a laser source) is coupled into an input waveguide 52 and is thereafter split to propagate along both a first waveguiding arm 54 and a second waveguiding arm 56 of modulator 50. SISCAP optical waveguiding device 20 (formed as discussed above in association with FIGS. 3 and 4) is disposed along first waveguiding arm 54 of analog optical modulator 50. The application of an input analog electrical signal to SISCAP device 20, shown as RF input signal 45 and coupled to contact 42 of SISCAP device 20, will result in the generation of an analog optical output signal which replicates the modulation of RF input signal 45. An appropriate bias voltage 47, as discussed below, is also applied to SISCAP device 20 to create the proper operating point, as described above in association with FIG. 5. The phase shifted light from first waveguiding arm 54 is thereafter re-combined with the signal propagating along second waveguiding arm 56 so as to form the amplitude modulated optical signal which is coupled into an output waveguide 58.

As mentioned above, SISCAP modulator 50 is formed within an SOI platform 60. The small form factor of SISCAP modulator 50 enables integration of a large number of modulators into an array on the same silicon substrate; thus, high density optical integration can be achieved. This aspect of the present invention is described in detail hereinbelow in association with FIGS. 14 and 15. Advantageously, other associated optical (e.g., optical filters and photodetectors) and electrical components (e.g., transimpedance amplifiers, A/D converters, input signal filters, etc.) of a complete system may be formed within SOI platform 60 so as to provide a monolithic system arrangement. Further shown in FIG. 6, is an inverse nanotaper coupler 62, which is utilized in this embodiment to couple the incoming free space optical signal into input waveguide 52 of modulator 50.

SISCAP optical waveguiding device 20 is particularly illustrated in FIG. 6 by the disposition of RF signal/bias signal contacts 42/40 (see FIG. 3). The continuously phase-shifting optical signal propagating along first arm 54 will then combine with the original optical signal propagating along second arm 56, to form the modulated optical output signal which is coupled into output waveguide 58. Should this signal need to thereafter be transmitted off of SOI platform 60, an inverse nanotaper output coupler 64 can be used (disposed at the termination of output waveguide 58), allowing the propagating, modulated signal to be focused into a free space optical output signal path (such as, for example, an output optical fiber).

Figure 7:
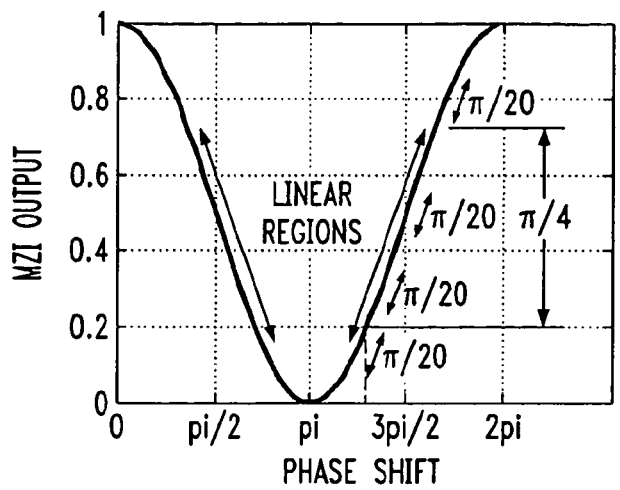
FIG. 7 contains a graph of the output response of a MZI as a function of the differential phase shift between the two arms, associated with the modulator of FIG. 6.

FIG. 7 shows an output response curve with a phase shift for the SISCAP analog optical modulator of the present invention. Linear operating regions, as required for analog performance in accordance with the present invention, are indicated by the double-ended arrows. Operation within these regions is accomplished by appropriately biasing SISCAP waveguide guiding device 20; for example, near the quadrature points (either $\pi/2$ or $3\pi/2$). Techniques such as thermal or DC tuning may be used to maintain the operating point of analog modulator 50 at the selected operating point (typically, for example, at quadrature).

Inasmuch as some embodiments require only a relatively small phase shift (on the order of $\pm\pi/20$, for example), the device may be biased at one of various locations along the curve, as shown, and maintain linear operation. As larger and larger phase shifts are required (e.g., $\pm\pi/4$, necessary, perhaps, in the presence of a larger input signal level), biasing near the quadrature points ($\pi/2$ or $3\pi/2$) is preferred to maintain linearity over the entire operating region.

FIG. 6 illustrates a particular embodiment of the present invention where the analog optical modulator utilizes only one SISCAP optical waveguiding device. While this arrangement can be operated as an analog modulator, it is inherently "unbalanced", since the optical path lengths of the two arms are different.

Figure 8:
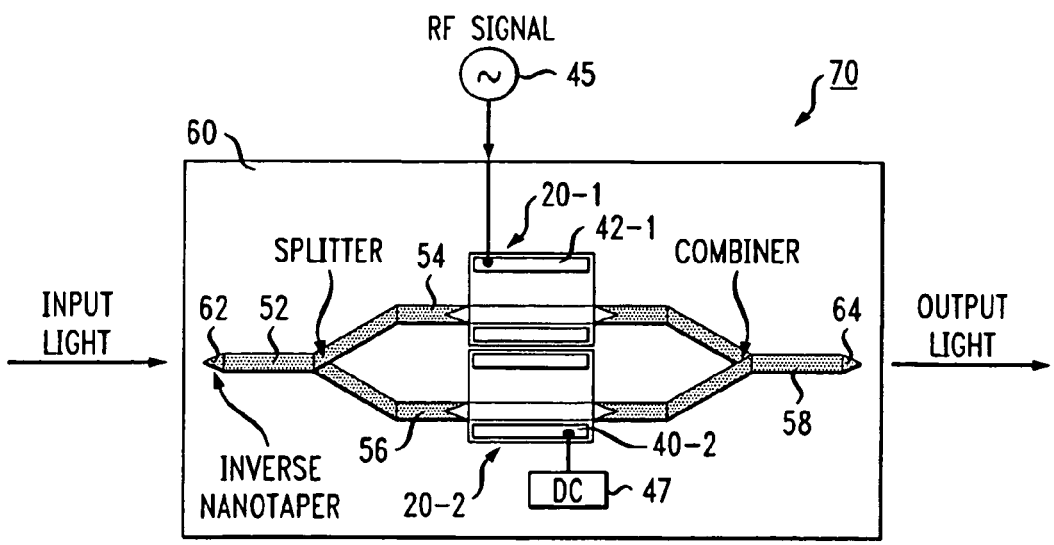
FIG. 8 illustrates another embodiment of the present invention, in this case utilizing a pair of SISCAP optical waveguiding devices in a balanced MZI configuration.

FIG. 8 illustrates an exemplary balanced analog optical modulator 70, formed in accordance with the present invention. Those elements of modulator 70 which are identical to those of modulator 50 of FIG. 6 are indicated by the same reference numerals. In this embodiment, a pair of SISCAP optical waveguiding devices 20-1 and 20-2 are used to provide balanced analog modulation. As shown, a first SISCAP device 20-1 is disposed along first waveguiding arm 54 and a second SISCAP device 20-2 is disposed along second waveguiding arm 56. In this embodiment, RF input signal 45 is applied to contact area 42-1 of SISCAP device 20-1 and DC bias 47 is applied to contact area 40-2 of SISCAP device 20-2. The use of essentially identical devices, integrated within the structure during the same processing steps, ensures that the optical path lengths for both arms 54 and 56 are nearly identical.

Figure 9:
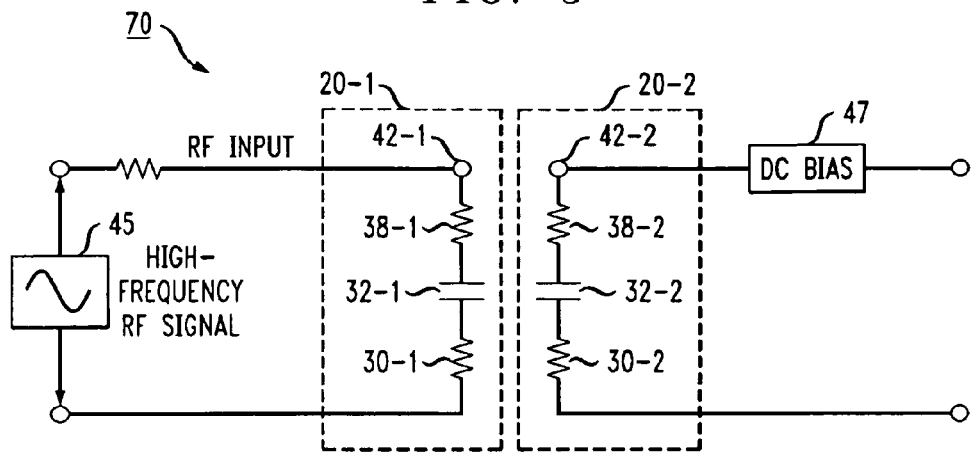
FIG. 9 is a schematic diagram of the balanced MZI configuration of FIG. 8.

FIG. 9 is a schematic representation of one exemplary embodiment of modulator 70. In this figure, SISCAP device 20-1 is depicted by a first resistive element as doped polysilicon region 38-1, a capacitor as (essentially) thin oxide layer 32-1 and a second resistive element as doped silicon region 30-1. SISCAP device 20-2 is similarly depicted. In this arrangement, RF input signal 45 is shown as applied to SISCAP device 20-1 along first arm 54 and a DC bias voltage source 47 is coupled to SISCAP device 20-2 disposed along second arm 56.

Figure 10:
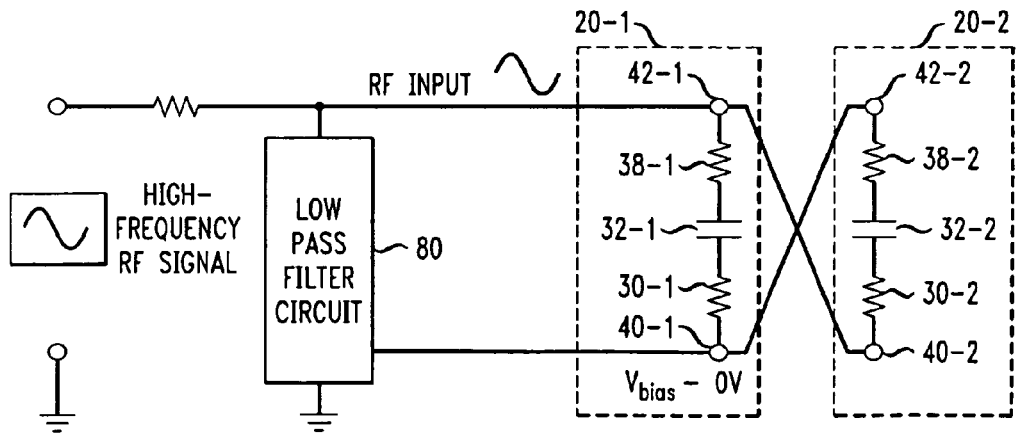
FIG. 10 is a schematic diagram of an alternative, common mode configuration of the embodiment of FIG. 8, incorporating a low pass filter circuit.

FIG. 10 contains a schematic illustration of another embodiment of balanced modulator 70 of FIG. 8. In this configuration, SISCAP devices 20-1 and 20-2 are crosscoupled in a common mode arrangement so as to achieve a push-pull operation of the modulator while maintaining the DC bias voltage around 0V. As shown, the input RF signal is applied to both contact 42-1 and contact 40-2. Region 30-1 (of SISCAP device 20-1) and polysilicon region 38-2 (of SISCAP device 20-2) are similarly connected together ("shorted") as shown.

The inclusion of a low pass filter 80 across SISCAP optical waveguiding device 20-1 (or alternatively, across SISCAP device 20-2), ensures that $V_{bias}$ remains at essentially zero volts for the shorted connection of regions 30-1 and 38-2. This arrangement allows for the modulation to occur around a zero bias value, which ensures SISCAP device operation in the lowest possible capacitance region, enabling the desired high frequency performance.

Figure 11:
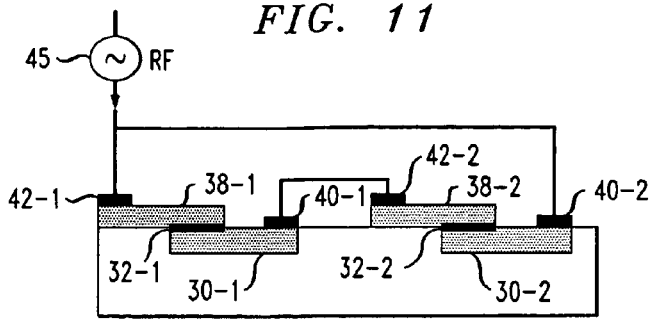
FIG. 11 is a cross-sectional view of an exemplary SISCAP geometry associated with the common mode configuration of FIG. 10.

FIG. 11 is a cross-sectional view of an exemplary SISCAP optical modulator 70 as formed in accordance with the present invention. The view in FIG. 11 is particularly associated with the common mode configuration of FIG. 10 and illustrates the electrical connections between the regions of each device. The application of RF input signal 45 to the connected contacts 42-1 and 40-2 is shown, as well as the electrical interconnection between contacts 40-1 and 42-2.

Figure 12:
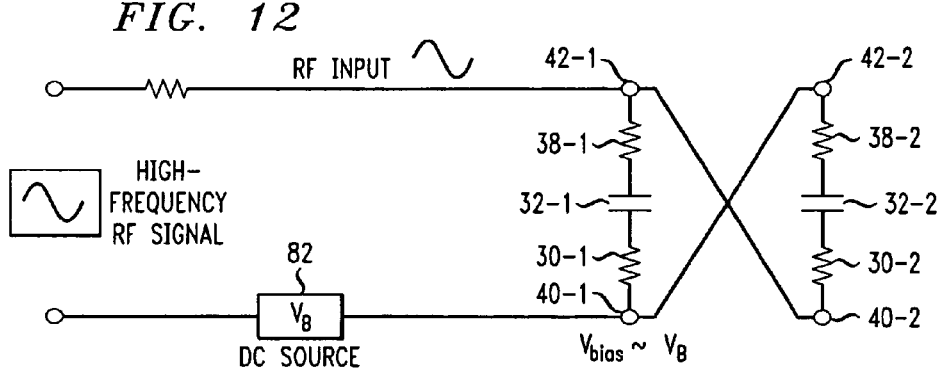
FIG. 12 is a schematic of an alternative embodiment of a common mode configuration, in this case using a separate DC source to supply the bias voltage to the cross-coupled SISCAP optical waveguiding devices.

An alternative configuration of an analog SISCAP optical modulator of the present invention is shown in FIG. 12. Here, a well-controlled DC bias 82 is applied to the common mode configuration of SISCAP devices 20-1 and 20-2 (in place of a low pass filter, as shown in FIG. 10). DC source 82 is illustrated as coupled to the connection of SOI layer 30-1 and polysilicon region 38-2, and is used to apply and maintain a predetermined DC bias voltage (indicated as $V_B$) at this node. In one configuration, the selected value of $V_B$ may be associated with the particular value of $C_{max}$ for this SISCAP optical waveguiding device (see FIG. 5), ensuring linear operation of the modulator in the presence of weak input signals.

Advantages of the SISCAP-based analog optical modulator of the present invention are its small size, low power dissipation, linearity and high bandwidth. SISCAP based modulators can be used for many RF photonics applications—for example, phased array antennas, analog communication (CATV), digital beam forming and the like. In several of these applications, use of a SISCAP-based modulator will allow a significant reduction in size and power dissipation, permitting an array of such modulators to be integrated within a single silicon substrate. Also, the SOI platform enables a seamless integration of other optical and electrical functionality with the analog modulator.

Figure 13:
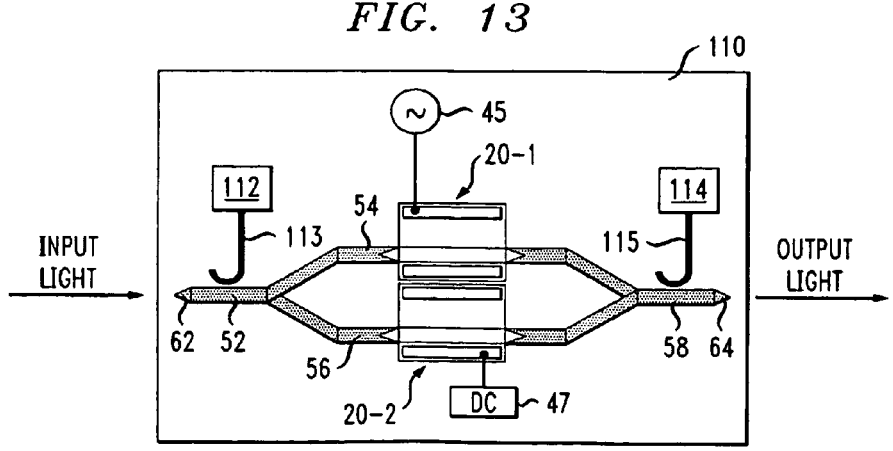
FIG. 13 illustrates an exemplary analog optical modulator, formed within an SOI structure, where associated feedback elements are integrated within the same SOI structure.

Indeed, FIG. 13 illustrates an exemplary SOI platform 110 including both SISCAP-based modulator 70 (as described above in association with FIG. 8) and a plurality of separate optical elements which are used to monitor and control the performance of modulator 70. As shown, the additional separate optical elements include a pair of photodetecting devices 112, 114 and a pair of corresponding coupling waveguides 113, 115, respectively. Photodetecting device 112 and coupling waveguide 113 are disposed along input optical waveguide 52 of modulator 70, and photodetecting device 114 and coupling waveguide 115 are disposed along output optical waveguide 58. In operation, a portion of an incoming optical signal may be tapped off by waveguide 113 and processed by photodetecting device 112 to monitor the power of the incoming optical signal. The modulated optical output signal can be similarly monitored by directing a portion of the modulated optical signal into waveguide 115 and photodetector 114. These photodetector signals can be used, for example, as feedback signals to control the applied RF signal, electrical bias signal, power level of the incoming CW optical signal, and the like. Significantly, the formation of SISCAP analog optical modulator 70 within an SOI-based arrangement allows for the associated feedback elements to be fully integrated within the same SOI structure.

Figure 14:
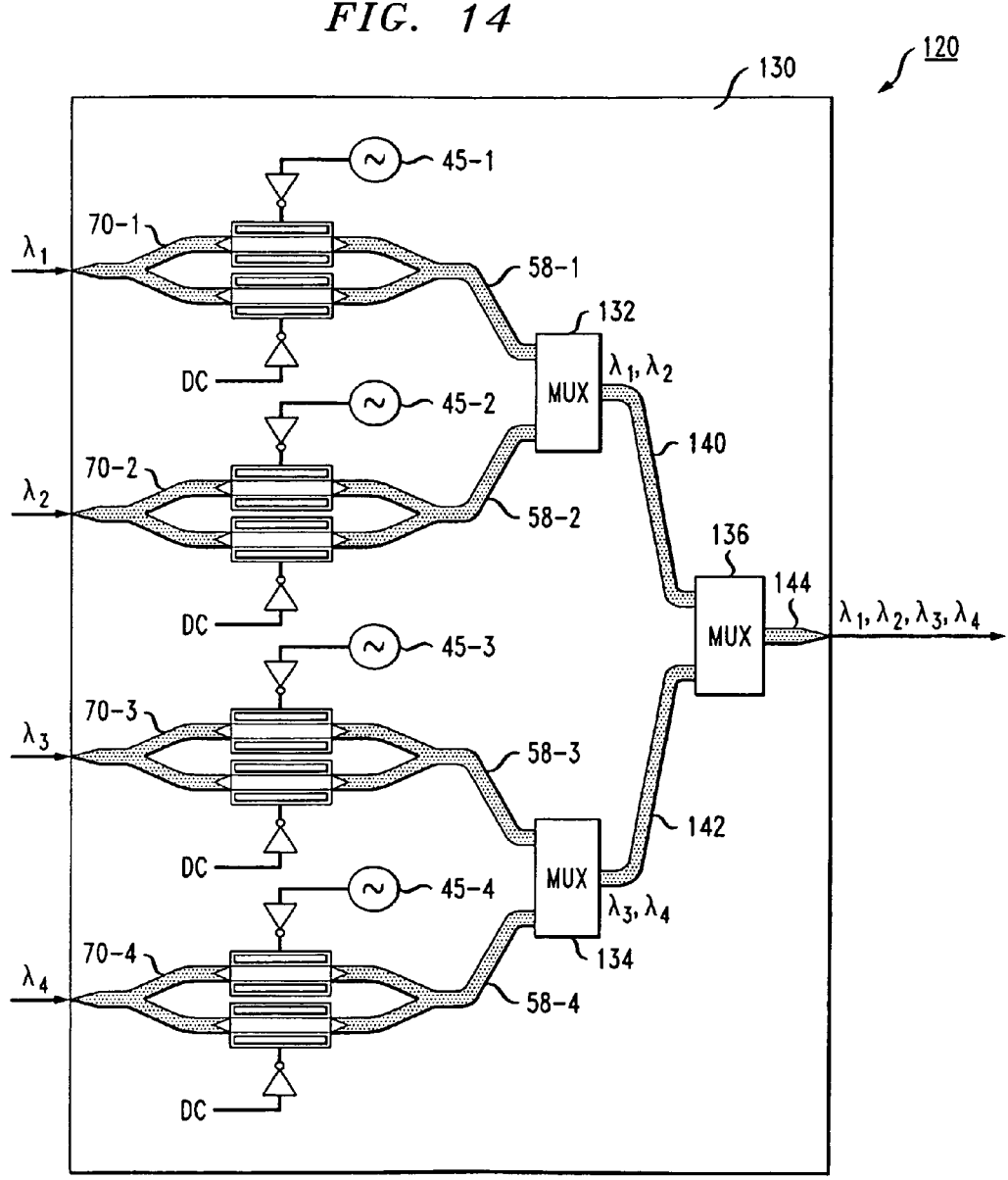
FIG. 14 illustrates an exemplary array arrangement of modulators, formed within the SOI structure and used to modulate and multiplex a plurality of separate optical signals onto a single output waveguide.

As mentioned above, there are many applications which require an array of optical modulators. The ability to reduce the size and power requirements of the array structure (particularly when compared with prior art $LiNbO_3$ arrangements) is an ever-important goal in various communication applications. FIG. 14 illustrates one exemplary SISCAP-based analog optical modulator array 120, where array 120 is formed fully within an SOI platform as a monolithic arrangement. In this particular embodiment, array 120 includes a set of four separate SISCAP-based analog optical modulators 70-1, 70-2, 70-3 and 70-4, where each modulator receives a separate optical input signal at different wavelengths, shown as $\lambda_1, \lambda_2, \lambda_3$ and $\lambda_4$.

A set of four separate incoming data signals (shown as 45-1, 45-2, 45-3 and 45-4) are used to modulate the four separate optical signals, creating a set of four modulated optical output signals along waveguides 58-1, 58-2, 58-3 and 58-4. In this particular embodiment of the present invention, SOI structure 130 further comprises a plurality of waveguides which are disposed as coupling waveguides to combine the various modulated signals and used in conjunction with a pair of integrated wavelength division multiplexers ("MUX") to couple the plurality of modulated signals onto a single output optical waveguide.

In particular, output waveguides 58-1 and 58-2 are formed to become inputs to a first MUX 132, which functions to multiplex both incoming signals onto a first waveguide 140 (where wavelengths $\lambda_1$ and $\lambda_2$ are shown in association with first waveguide 140). Similarly, the modulated signals propagating along output waveguides 58-3 and 58-4 are thereafter combined within a second MUX 134 (also integrated within SOI structure 130) and are subsequently combined onto second waveguide 142 (see $\lambda_3$ and $\lambda_4$ illustrated with second waveguide 142). The two sets of modulated optical signals are then ultimately combined within a third MUX 136 onto output waveguide 144, which thereafter supports the multiplexed transmission of the plurality of modulated signals.

In accordance with the present invention, the ability to form each of these components of the SISCAP-based analog modulators, waveguides and multiplexers within a silicon structure allows for the arrangement to exhibit relatively small overall dimensions, particularly when compared with prior art $LiNbO_3$-based array structures. Similarly, a demultiplexing (DMUX) operation can be achieved in an SOI platform using components such as interleavers, Echelle gratings, ring resonators, and the like.

Figure 15:
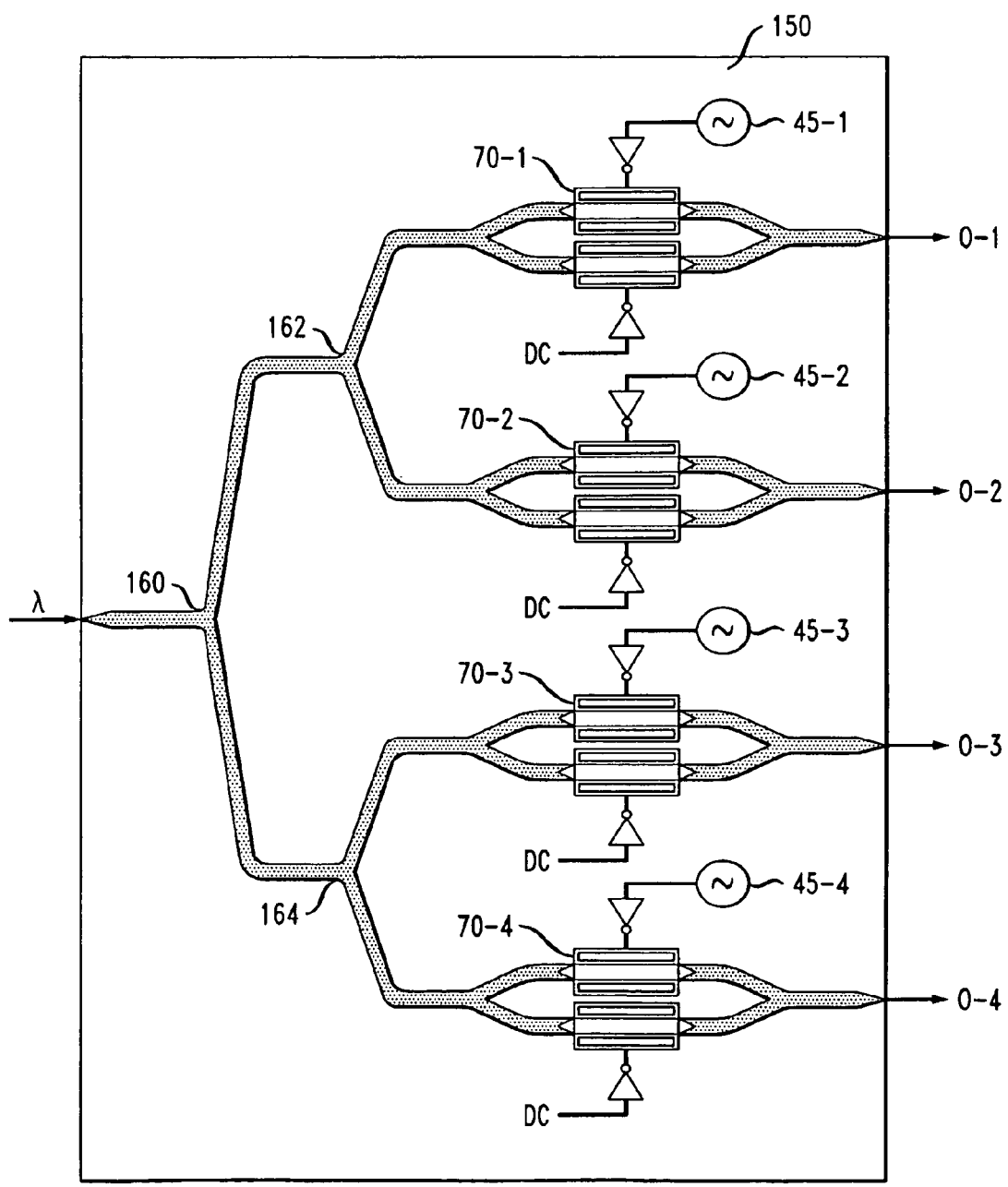
FIG. 15 illustrates another exemplary monolithic analog modulator array arrangement, in this arrangement a single input signal generates a plurality of separate output modulated signals based upon a plurality of SISCAP analog optical modulators.

In another exemplary embodiment, a single incoming optical signal may be divided among a plurality of N SISCAP-based analog optical modulators, associated with a plurality of separate RF signals, to create a plurality of N modulated optical output signals. FIG. 15 illustrates one exemplary monolithic arrangement of this embodiment of the present invention, where a set of four separate SISCAP-based analog optical modulators 70-1, 70-2, 70-3 and 70-4 are formed within an SOI platform 150. As shown, a set of waveguides 160, 162 and 164—which are also directly formed in SOI platform 150—are used to divide the incoming optical signal between each of the modulators. While the specific structure of FIG. 15 implies that an equal optical power is launched into the input of each modulator 70, it is to be understood that the physical dimensions and related parameters of each waveguide 160, 162 and 164 may be modified to direct different percentages of the available optical signal power into each modulator.

As further shown in FIG. 15, a separate set of RF modulator sources 45-1, 45-2, 45-3 and 45-4 are used to transfer a plurality of separate data signals onto the optical input signal. Therefore, a plurality of modulated optical output signals, shown as O-1, O-2, O-3 and O-4 in FIG. 15, are created, within a monolithic structure, from a single optical input signal.

While not particularly illustrated in either FIG. 14 or 15, it is to be understood that various other optical and electrical components may also be integrated within the SOI platform for use with the array structure. Electrical filters, transimpedance amplifiers, A/D converters, and the like, are often used with these array configurations. Further, the photodetecting devices, such as those shown in FIG. 13, may also be of use, particularly to "tune" the specific wavelengths associated with the multiple modulator elements.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An analog optical modulator formed within an SOI structure including a silicon substrate, an overlying oxide layer and a relatively thin silicon surface waveguiding layer, the analog optical modulator comprising an optical interferometer formed within the relatively thin silicon surface waveguiding layer, the interferometer including an input optical waveguide, a pair of parallel waveguiding arms and an output optical waveguide, with an input Y-splitter disposed between the input optical waveguide and an input to the pair of parallel waveguiding arms and an output Y-combiner disposed between an output of the pair of parallel waveguiding arms and the output optical waveguide, a continuous wave (CW) optical input signal coupled into the input optical waveguide; and at least one silicon-insulator-silicon capacitance (SISCAP) optical waveguiding device disposed in at least one of said pair of parallel waveguiding arms, the SISCAP optical waveguiding device comprising a first silicon region within the relatively thin silicon surface waveguiding layer doped to exhibit a first conductivity type;

a second silicon region disposed to overlap, in part, the first silicon region, the second silicon region doped to exhibit a second, opposite conductivity type;

a relatively thin dielectric layer disposed in an overlap area between said first and second doped silicon regions, a combination of said first and second doped silicon regions with the interposed relatively thin dielectric layer defining an active region of an electro-optic device;

a voltage bias applied across the at least one SISCAP optical waveguiding device to create a predetermined, constant capacitance value across the at least one SISCAP optical waveguiding device, thereby forming a linear operating region for the analog optical modulator; and an input RF electrical signal coupled to the second silicon region of the at least one SISCAP device, wherein the application of said input RF electrical signal, in combination with the voltage bias, modifies a phase of an optical signal passing therethrough to create a modulated analog optical output signal along the optical output waveguide, the modulated analog optical output signal replicating the input RF electrical signal.

2. The modulator as defined in claim 1 wherein the at least one SISCAP optical waveguiding device comprises a pair of SISCAP optical waveguiding devices, with a first device of said pair disposed along a first optical waveguiding arm of the pair of parallel waveguiding arms of the optical interferometer and a second device of said pair disposed along the other optical waveguiding arm of the pair of parallel waveguiding arms of the optical interferometer.

3. The modulator as defined in claim 2 wherein the pair of SISCAP optical waveguiding devices are cross-coupled into a common mode configuration, the input RF signal applied to a cross-coupled connection of the second silicon region of one SISCAP device with the first silicon region of the other SISCAP device.

4. The modulator as defined in claim 3 wherein the voltage bias is maintained at an essentially zero voltage level.

5. The modulator as defined in claim 4 wherein the modulator further comprises a low pass electrical filter coupled across the first SISCAP optical waveguiding device to substantiate operation with a zero bias voltage.

6. The modulator as defined in claim 5 wherein the low pass electrical filter is integrated within the same SOI structure as the modulator.

7. The modulator as defined in claim 3 wherein the voltage bias is provided by a constant DC voltage source coupled to the remaining first and second silicon regions of the SISCAP devices to maintain an essentially constant DC bias voltage.

8. An integrated optical communication system formed within an SOI structure comprising a silicon substrate, an overlying insulating layer and a relatively thin surface silicon waveguiding layer, the integrated optical communication system comprising an analog optical modulator including an optical interferometer formed within the relatively thin silicon surface waveguiding layer, the interferometer including an input optical waveguide, a pair of parallel waveguiding arms and an output optical waveguide, with an input Y-splitter disposed between the input optical waveguide and an input to the pair of parallel waveguiding arms and an output Y-combiner disposed between an output of the pair of parallel waveguiding arms and the output optical waveguide, a continuous wave (CW) optical input signal coupled into the input optical waveguide; and at least one silicon-insulator-silicon capacitance (SISCAP) optical waveguiding device disposed in at least one of said pair of parallel waveguiding arms, the SISCAP optical waveguiding device comprising a first silicon region within the relatively thin silicon surface waveguiding layer doped to exhibit a first conductivity type;

a second silicon region disposed to overlap, in part, the first silicon region, the second silicon region doped to exhibit a second, opposite conductivity type;

a relatively thin dielectric layer disposed in an overlap area between said first and second doped silicon regions, a combination of said first and second doped silicon regions with the interposed relatively thin dielectric layer defining an active region of an electro-optic device;

a voltage bias applied across the at least one SISCAP optical waveguiding device to create a predetermined, constant capacitance value across the at least one SISCAP optical waveguiding device, thereby forming a linear operating region for the analog optical modulator; and an input RF electrical signal coupled to the second silicon region of the at least one SISCAP device, wherein the application of said input RF electrical signal, in combination with the voltage bias, modifies a phase of an optical signal passing therethrough to create a modulated analog optical output signal along the optical output waveguide, the modulated analog optical output signal replicating the input RF electrical signal; and at least one optical component integrated within the SOI structure with the analog modulator; and at least one electrical component integrated within the SOI structure with the analog modulator.

9. The system as defined in claim 8 wherein the at least one optical component comprises a photodetecting device.

10. The system as defined in claim 9 wherein the at least one optical component further comprises an out-coupling waveguide disposed between a selected portion of the interferometer and the photodetecting device such that the photodetecting device provides an electrical signal representative of a performance of said interferometer.

11. The system as defined in claim 8 wherein the at least one electrical component comprises a transimpedance amplifier coupled to an input of the analog optical modulator.

12. A silicon-based arrangement integrated within a single SOI structure, comprising a silicon substrate, an overlying insulating layer and a relatively thin surface silicon layer, the arrangement comprising a plurality of N analog optical modulators interconnected in a predetermined array configuration, each analog modulator comprising:

an optical interferometer formed within the relatively thin silicon surface waveguiding layer, the interferometer including an input optical waveguide, a pair of parallel waveguiding arms and an output optical waveguide, with an input Y-splitter disposed between the input optical waveguide and an input to the pair of parallel waveguiding arms and an output Y-combiner disposed between an output of the pair of parallel waveguiding arms and the output optical waveguide, a continuous wave (CW) optical input signal coupled into the input optical waveguide; and at least one silicon-insulator-silicon capacitance (SISCAP) optical waveguiding device disposed in at least one of said pair of parallel waveguiding arms, the SISCAP optical waveguiding device comprising a first silicon region within the relatively thin silicon surface waveguiding layer doped to exhibit a first conductivity type;

a second silicon region disposed to overlap, in part, the first silicon region, the second silicon region doped to exhibit a second, opposite conductivity type;

a relatively thin dielectric layer disposed in an overlap area between said first and second doped silicon regions, a combination of said first and second doped silicon regions with the interposed relatively thin dielectric layer defining an active region of an electro-optic device;

a voltage bias applied across the at least one SISCAP optical waveguiding device to create a predetermined, constant capacitance value across the at least one SISCAP optical waveguiding device, thereby forming a linear operating region for the analog optical modulator; and an input RF electrical signal coupled to the second silicon region of the at least one SISCAP device, wherein the application of said input RF electrical signal, in combination with the voltage bias, modifies a phase of an optical signal passing therethrough to create a modulated analog optical output signal along the optical output waveguide, the modulated analog optical output signal replicating the input RF electrical signal; and a plurality of optical waveguides, formed within the relatively thin silicon surface layer and arranged to form connections among the plurality of N analog optical modulators.

13. The arrangement as defined in claim 12 wherein a select group of optical waveguides within the plurality of optical waveguides are disposed to create optical signal splitters between at least two modulators of the plurality of N analog optical modulators.

14. The arrangement as defined in claim 12 wherein a select group of optical waveguides within the plurality of optical waveguides are disposed to create optical signal combiners between at least two modulators of the plurality of N analog optical modulators.

* * * * *